United States Patent [19]

Dias et al.

[11] 4,256,786

[45] Mar. 17, 1981

[54] CHEMICAL PROTECTIVE, FIRE RESISTANT COMPOSITION

[75] Inventors: Gil M. Dias, Fall River, Mass.; Armando C. Delasanta, Woonsocket, R.I.

[73] Assignee: The United States of America as represented by the Secretary of the Army, Washington, D.C.

[21] Appl. No.: 56,581

[22] Filed: Jul. 11, 1979

[51] Int. Cl.³ .................... B05D 3/02; B05D 5/00; B32B 5/18; B32B 27/00
[52] U.S. Cl. .................. 427/244; 260/29.6 MP; 427/393.3; 427/393.5; 428/276; 428/315; 428/921
[58] Field of Search ............. 428/315, 276, 921; 260/29.6 MP; 427/244, 389.9, 393.5, 393.3

[56] References Cited

U.S. PATENT DOCUMENTS

| | | | |
|---|---|---|---|
| 3,303,086 | 2/1967 | Demers | 428/315 |
| 3,449,161 | 6/1969 | Hindersinn et al. | 260/29.6 X |
| 3,562,197 | 2/1971 | Sears et al. | 260/29.6 X |
| 3,681,273 | 8/1972 | Kelly | 260/2.5 AJ |
| 3,775,350 | 11/1973 | Juhas | 428/315 |
| 3,914,193 | 10/1975 | Fessler et al. | 260/29.6 X |
| 3,934,066 | 1/1976 | Murch | 428/315 X |
| 3,969,291 | 7/1976 | Fukuba et al. | 428/921 X |
| 4,043,987 | 8/1977 | Jolicoeur et al. | 260/29.6 X |

FOREIGN PATENT DOCUMENTS 750142  9/1970  Belgium ................... 428/315

OTHER PUBLICATIONS

MIL-c-43858 (6,L), 9/5/73.

*Primary Examiner*—Michael R. Lusignan
*Attorney, Agent, or Firm*—Nathan Edelberg; Robert P. Gibson; Lawrence E. Labadini

[57] ABSTRACT

A chemical protective, fire resistant composition for impregnating plastic foam and textile laminate combinations and the process for imparting both chemical protection properties and fire resistance to plastic foam and textile laminate combinations, particularly to polyurethane foam and cotton fabric laminates or polyurethane foam and selected polyamide fabric laminates.

5 Claims, No Drawings

CHEMICAL PROTECTIVE, FIRE RESISTANT COMPOSITION

The invention described herein may be manufactured, used, and licensed by or for the Government for governmental purposes without the payment to us of any royalty thereon.

BACKGROUND OF THE INVENTION

This invention relates to compositions for impregnating plastic foam and textile laminate combinations to impart chemical protection and fire resistance thereto, to a process for imparting both chemical protection and fire resistance to a plastic foam and textile laminate combination and to the resulting product.

In the field of chemical protection it has been customary for some time to employ polyurethane foam laminates with textile materials, such as nylon tricot knit cloth, impregnated with active carbon dispersed in an aqueous slurry and thereafter dried. Such products for use in making garments are covered by Military Specification MIL-C-43858(GL), 5 September 1973, "Cloth, Laminated, Nylon Tricot Knit, Polyurethane Foam Laminate For Chemical Protection". However, thus far products produced in accordance with that specification have not possessed fire resistance and, therefore, have constituted a serious hazard in situations where the wearers of such garments might be exposed to flames. Numerous attempts to apply fire retardants to such chemical protective materials have proven unsuccessful because of the necessity of using organic solvents in the preparation of fire retardant solutions or suspensions for application of the selected fire retardant materials to the polyurethane foam laminates and the tendency of such organic solvents to destroy or greatly reduce the activity of the carbon employed for imparting chemical protection to the laminates.

An object of the invention is to provide compositions for impregnating plastic foam and textile laminate combinations to impart chemical protection and fire resistance thereto.

It is also an object of the invention to provide a process for imparting both chemical protection and fire resistance to a plastic foam and textile laminate combination, and more particularly a polyurethane foam and textile laminate combination.

Other objects and advantages of the invention will be apparent from the following description.

SUMMARY OF THE INVENTION

The present invention provides novel compositions for application to polyurethane foam and textile combinations, particularly laminates thereof, to impart both chemical protection and fire resistance to such combinations.

These compositions are formed by preparing an aqueous slurry of active carbon, a phosphoric acid-releasing fire retardant, such as ammonium polyphosphate, a carbonific, such as tripentaerythritol, and a binder, such as an anionic type acrylic resin.

A preferred formulation generally will fall within the following exemplary ranges of preferred ingredients:

| Preferred Component | Preferred Range, % by weight |
| --- | --- |
| Active carbon black | 23.6–25.2 |
| Styrenemaleic anhydride copolymer | 0.048–0.144 |
| Carboxymethylcellulose | 0.606–0.651 |
| Ammonium polyphosphate (preferably the product of Monsanto, sold under the trademark Phos-Chek, decomposing at 325° C. | 6.0–8.0 |
| Carbonific (preferably tripentaerythritol) | 1.6–4.2 |
| Anionic type acrylic resin, preferably the product of Rohm and Haas, sold under the trademark Rhoplex TR-908 (20% or 25% solids) | 2.0–2.5 |
| Water, sufficient to make the final slurry up to 100 percent | |

The selected formulation is applied to a polyurethane foam and textile laminate combination from a one-bath system by immersing the laminate combination in the slurry mixture, passing the treated material between two rubber rolls with a nip pressure of about 30 pounds per square inch, then oven-drying the treated material at 240° F. to 280° F.

It is to be understood that the term "chemical protection" as used in the Specification and Claims is intended to mean protection against toxic agents normally used in chemical warfare, which agents are usually referred to as "live toxic agents". In testing for chemical protection, carbon tetrachloride is used as a simulant for live toxic agents. The chemical protection properties of the treated product are tested by means of the standard vapor penetration method described in MIL-C-43858(GL), Sept. 5, 1973, "Cloth, Laminated, Nylon Tricot Knit, Polyurethane Foam Laminate For Chemical Protection". The degree of chemical protection is expressed in terms of the average absorption capacity for carbon tetrachloride vapors in milligrams of carbon tetrachloride absorbed per square centimeter of laminate surface exposed to the carbon tetrachloride.

The flame resistance of the resulting product is determined by applying either Method 5903, "Flame Resistance of Cloth, Vertical" or Method 5905, "Flame Resistance of Material; High Heat Flux Flame Contact", both being described in Federal Test Standard No. 191.

The ammonium polyphosphate in the formulation above acts as a catalyst and as a source of phosphoric acid as a result of the action of heat thereon. The phosphoric acid released by the ammonium polyphosphate reacts with the carbonific, esterifying hydroxyl groups therein. Subsequent to the occurrence of these esterification reactions, the esterified carbonific decomposes releasing substantial quantities of carbon, additional water, carbon monoxide, and non-flammable gases and also releasing the acid for further esterification reactions. In general, the ester begins to decompose at a temperature significantly lower than that at which the carbonific would decompose without its having been esterified by the phosphoric acid.

The decomposition of the ammonium polyphosphate combination with the carbonific results also in the release of gaseous materials, such as ammonia, which cause some blowing action, forming a cellular foam crust which, in cooperation with the phosphoric acid, tends to retard flaming by the polyurethane foam or the textile laminated thereto.

The ammonium polyphosphates that are used in the compositions of the invention are represented by the general formula:

$H_{(n-m)+2}(NH_4)_m P_n O_{3n+1}$ wherein n is an integer having an average value greater than 10 and the maximum of m being equal to n+2, and m/n has an average value between 0.7 and 1.1. Commercial ammonium polyphosphate is defined as having a water solubility of about 5 grams or less per 100 cc of water, evaluated by slurrying 10 grams of the solids in 100 cc of water for 60 minutes at 25° C.

Although the ammonium polyphosphate represented by the above formula are said to be "substantially water-insoluble", commercial ammonium polyphosphate is soluble in water to some extent since, in actuality, the solubility of the ammonium polyphosphate is about 1 to 5 g per 100 cc of water measured in the above-described manner. Hence the compositions of the invention would be contraindicated for treating combinations of polyurethane foam and textiles if exposure thereof to the weather is contemplated.

The carbonific is preferably tripentaerythritol, an oligomer of pentaerythritol composed of three molecular units of pentaerythritol.

All parts and percentages herein are by weight and all temperatures are on the Fahrenheit scale, unless expressly stated to be otherwise.

Compositions prepared in accordance with the invention are applied to the laminate to provide an add-on weight, dry solids basis, of from about 100% to about 200% by weight based on the laminate weight, to impart the desired chemical protective and fire-retardant properties. Naturally the less applied, the less effective is the treatment, and the more applied, the more effective and more expensive is the treatment. The amount selected for application can easily be determined by one skilled in the art to suit the particular circumstances surrounding use of the laminate.

DESCRIPTION OF THE PREFERRED EMBODIMENT

While the primary objective for the treated laminates is to provide adequate protection of a wearer of a garment made of one of the laminates against toxic chemical vapors or liquids, it is also important that the treated laminates possess adequate flame resistance.

The compositions of the invention and the application thereof to laminates of polyurethane foam with textile materials can be readily carried out with regular machinery in use in the textile trade without requiring any special operations or special training.

The invention will now be further described by means of specific examples:

EXAMPLE 1

Preferred Composition

The preferred composition in accordance with the invention is formulated as follows:

| Component | Percent by weight |
|---|---|
| Barnebey-Cheney XZ Charcoal | 25.2 |
| SMA 1440H (esterified styrenemaleic anhydride copolymer in 3.0% aqueous solution) | 1.6 |
| CMC-7M (carboxymethylcellulose protective colloid in 3.0% aqueous solution) | 21.7 |
| Ammonium Polyphosphate (Phos-Chek P/30) | 6.0 |
| Carbonific (tripentaerythritol) | 1.6 |
| Binder (Rhoplex TR-908 in 20% aqueous emulsion) | 10.0 |
| Water | 33.9 |
| total | 100.0 |

The above composition is prepared as follows:

25.2 g of Barnebey-Cheney XZ activated carbon black produced by Barnebey-Cheney, Columbus, Ohio, is dispersed in 23.9 g water, 1.6 g of a 3% aqueous solution of SMA 1440H (an esterified styrene-maleic anhydride copolymer dispersing agent produced by Arco Chemical Co., Philadelphia, Pennsylvania). This dispersion is ball milled until the carbon black is well dispersed. To this dispersion 21.7 g of a 3% aqueous solution of CMC-7M (a carboxymethylcellulose protective colloid produced by Hercules, Inc., Wilmington, Delaware), are added while stirring at moderate speed in a mechanical mixer. To the resulting slurry 6.0 g of Phos-Chek P/30 ammonium polyphosphate produced by Monsanto Corp. and ;b 1.6 g of tripentaerythritol, a polyfunctional alcohol, are added. Separately, 10 g of Rhoplex TR-908 (an anionic type acrylic resin binder produced by Rohm and Haas) in a 20% aqueous emulsion are diluted with 10 g of water and the resulting emulsion is adjusted to pH 6. This emulsion is hand-stirred and mixed with the above slurry including the Phos-Chek P/30 and the tripentaerythritol to complete the composition for use in treating a polyurethane foam and fabric combination.

The above-described composition is applied to two different fabric-polyurethane foam laminates by conventional fabric immersion and padding procedures followed by drying at about 240° F. to about 280° F. One of the fabric-polyurethane foam laminates is a 4.9 oz. per square yard "Nomex" pajama check cloth and polyurethane foam laminate which is prepared in accordance with Military Specification MIL-C-43858(GL) and flame bonded. The cloth used in making the laminate weighs about 3.0 oz. per square yard and the polyurethane foam weighs about 1.9 oz. per square yard and has a density of about 2.0 pounds per cubic foot.

The other fabric-polyurethane foam laminate is 4.1 oz. per square yard all-cotton knit fabric and polyurethane foam laminate prepared in accordance with Military Specification MIL-C-43858(GL) except that the cloth is 100% cotton rather than "Nomex", a type of nylon. The laminate is prepared by flame bonding the foam to the cotton cloth. The cloth used in making the laminate weighs about 2.2 oz. per square yard and the polyurethane foam weighs about 1.9 oz. per square yard and has a density of about 2.0 pounds per cubic foot.

Results of the application of the chemical protection and fire resistance composition of the "Nomex" cloth and polyurethane foam laminate and to the all-cotton knit fabric and polyurethane foam laminate are given below in Table 1, which summarizes the results of this example and Examples 2 and 3.

EXAMPLE 2

Alternative Composition

This alternative composition is prepared similarly to the preparation of the preferred composition in Example 1 except that the ammonium polyphosphate (Phos-Chek P/30) is increased to 8.0 percent and the total water added is decreased to 31.9 percent by reducing the amount of water used for diluting the Rhoplex TR-908 emulsion from 10 grams to 8 grams.

The resulting compositiion is applied to fabric-polyurethane foam laminates substantially identical to those of Example 1 in substantially the same manner and the resulting impregnated laminates are dried as in Example 1 and thereafter tested for chemical protection and flame resistance with the results obtained given in Table 1 below.

EXAMPLE 3

Alternative Composition

This alternative composition is prepared similarly to the preparation of the preferred composition in Example 1 except that the Barnebey-Cheney XZ Charcoal is decreased to 23.6 percent, the CMC-7M (3.0% solution) is decreased to 20.2 percent, the concentration of the Rhoplex TR-908 emulsion is increased to 25.0 percent, and the total water added is increased to 37.0 percent.

This alternative composition in accordance with the invention is formulated as follows:

| Component | Percent by weight |
|---|---|
| Barnebey-Cheney XZ Charcoal | 23.6 |
| SMA 1440H (esterified styrenemaleic anhydride copolymer in 3% aqueous solution) | 1.6 |
| CMC-7M (carboxymethylcellulose protective colloid in 3.0% aqueous solution) | 20.2 |
| Ammonium Polyphosphate (Phos-Chek P/30) | 6.0 |
| Carbonific (tripentaerythritol) | 1.6 |
| Binder (Rhoplex TR-908 in 25% aqueous emulsion) | 10.0 |
| Water | 37.0 |
| Total | 100.0 |

This resulting composition is applied to the cotton fabric-polyurethane foam laminate substantially identical to that of Example 1 in substantially the same manner and the resulting impregnated laminate is dried as in Example 1 and thereafter tested for chemical protection and flame resistance with the results obtained given in Table 1 below.

In Table 1, the chemical protection results were obtained in accordance with the test method for chemical protection given in Military Specification MIL-C-43858(GL). Chemical protection is determined in terms of milligrams of carbon tetrachloride absorption per square centimeter of surface area of the polyurethane foam and textile laminate combination. An acceptable level for this measure of chemical protection is 1.2 mg/cm$^2$.

The flame resistance results were obtained in accordance with two test methods described in Federal Test Standard No. 191, namely Method 5903 and Method 5905. In Table 1, AF refers to the time of after flaming, AG refers to the time of after glowing, and CL refers to the char length. Percent consumed refers to the percentage of a 12-inch length of sample consumed by the flame applied to the sample in accordance with Method 5905.

Although a preference has been expressed above for the XZ Charcoal of Barnebey-Cheney, active carbons from other sources may be used in making the compositions of the invention. For example, carbon blacks produced by Calgon Corporation, Pittsburgh, Pa., Westvaco Corporation, New York, N. Y., and Union Carbide Corporation, New York, N. Y., have been found to produce acceptable results. Active carbon is to be understood as meaning a carbon having a surface area of at least 300 m$^2$/g as determined by the BET method.

Although a preference has been expressed above for the SMA-1440H styrene maleic anhydride copolymer to serve as a dispersing agent for the active carbon during the preparation of the chemical protective, fire resistant compositions of the invention, other dispersing agents may be used, for example, "Lomar D", a polymerized naphthalene sulfonate, produced by Diamond Shamrock Chemical Co., may be used in place of SMA-1440H with good results.

Although a preference has been expressed above for carboxymethylcellulose as a protective colloid, which serves to stabilize the emulsion of the carbon black produced with the aid of the SMA-1440H dispersing agent, other emulsion stabilizers may be used, among which "Acrysol ASE 60", an acrylic copolymer produced by Rohm & Haas, may be used.

Although tripentaerythritol has been disclosed above as the preferred carbonific for incorporation in the compositions of the invention, other carbonifics may be used. Such materials are generally hydroxyl-containing compounds, such as various sugars, e.g. glucose, maltose, or arabinose; polyhydric alcohols, e.g. erythritol,

TABLE 1

Chemical Protection And Flame Resistance Characteristics Of Treated Laminates

| Example | Fabric System | Wet Pickup (Percent of dry weight of laminate) | Dry Add-On (Percent of dry weight of laminate) | Weight (oz./yd$^2$ Final) | Chemical Protection (mg/cm$^2$) | Flame Resistance (Method 5903) | | | Flame Resistance (Method 5905) | |
|---|---|---|---|---|---|---|---|---|---|---|
| | | | | | | AF (sec.) | AG (sec.) | CL (in.) | AF (sec.) | Percent Consumed |
| 1 | 4.9 oz. Nomex Pajama Check & Std. Foam Lam. | 305 | 105 | 10.40 | 1.07 | 0 | 1 | 2.0 | 0 | 15 |
| 1 | 4.1 oz. Cotton Knit & Std. Foam Lam. | 527 | 188 | 11.61 | 1.72 | 0 | 1 | 3.4 | 0 | 19 |
| 2 | 4.9 oz. Nomex Pajama Check & Std. Foam Lam. | 303 | 104 | 10.50 | 1.18 | 0 | 1 | 2.1 | 0 | 31 |
| 2 | 4.1 oz. Cotton Knit & Std. Foam Lam. | 483 | 172 | 11.10 | 1.90 | 0 | 1 | 3.3 | 0 | 23 |
| 3 | 4.1 oz. Cotton Knit & Std. Foam Lam. | 453 | 160 | 10.64 | 1.10 | 0 | 2 | 3.4 | 0 | 13 |
| | Untreated 4.9 oz. Nomex Pajama Check & Std. Foam Lam. | | | | 0.00 | Completely Consumed | | | Completely Consumed | |
| | Untreated 4.1 oz. Cotton Knit & Std. Foam Lam. | | | | 0.00 | Completely Consumed | | | Completely Consumed | | pentaerythritol, arabitol, sorbitol, or inositol; polyhydric phenols, e.g. resorcinol, and various starches.

While special prefernce has been indicated above with respect to the use of "Rhoplex TR-908" as the binder for binding the various components of the compositions of the invention to the polyurethane foam and textile material forming the laminates, other binders may be used; anionic acrylic resins, particularly those of the type of the "Rhoplex" resins produced by Rohm and Haas, and especially the relatively soft "Rhoplex" resins may be used with good results.

The present invention has for the first time made it possible to produce a polyurethane foam and textile fabric laminate having good chemical protection properties and at the same time good flame resistance.

It will be understood that various changes in the details, materials, proportions and manner of combining the various ingredients of the compositions of the invention which have been described in order to explain the nature of the invention, may be made by those skilled in the art within the principle and scope of the invention.

We claim:

1. A process for imparting chemical protection properties and fire resistance to a polyurethane foam and textile laminate combination comprising impregnating said foam laminate combination with an aqueous dispersion of:

a. 6.0 to 8.0% by weight ammonium polyphosphate;
   b. 1.6 to 4.2% by weight of a carbonific;
   c. 23.6 to 25.2% by weight of an active carbon;
   d. 2.0 to 2.5% by weight of an anionic type acrylic resin;
   e. 0.048 to 0.144% by weight of a dispersing agent for the active carbon;
   f. 0.606 to 0.651% by weight of a protective colloid; and
   g. Water sufficient to make up 100%; and drying the impregnated polyurethane foam and textile laminate combination.

2. A process according to claim 1 wherein from about 100% to about 200% on a dry weight basis of the ingredients of the said chemical protective, fire resistant composition based on the weight of said polyurethane foam and textile laminate combination is applied to said laminate combination.

3. A process according to claim 2 wherein the carbonific is tripentaerythritol.

4. A process according to claim 3 wherein the dispersing agent is styrene maleic anhydride copolymer and the protective colloid is carboxymethylcellulose.

5. A process according to claim 4 wherein said polyurethane foam weighs about 1.9 oz/sq yd and has a density of about 2.0 lbs/cubic foot.

* * * * *